(12) United States Patent
Ono et al.

(10) Patent No.: US 8,929,675 B2
(45) Date of Patent: Jan. 6, 2015

(54) IMAGE PROCESSING DEVICE FOR VIDEO NOISE REDUCTION

(75) Inventors: Toshiyuki Ono, Kawasaki (JP);
Toshimitsu Kaneko, Kawasaki (JP);
Nobuyuki Matsumoto, Inagi (JP);
Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 180 days.

(21) Appl. No.: 13/344,069

(22) Filed: Jan. 5, 2012

(65) Prior Publication Data
US 2012/0105718 A1 May 3, 2012

Related U.S. Application Data

(63) Continuation of application No. PCT/JP2009/003145, filed on Jul. 7, 2009.

(51) Int. Cl.
*G06K 9/40* (2006.01)
*H04N 5/14* (2006.01)
*H04N 5/21* (2006.01)

(52) U.S. Cl.
CPC . *H04N 5/144* (2013.01); *H04N 5/21* (2013.01)
USPC .......................................................... 382/254

(58) Field of Classification Search
None
See application file for complete search history.

(56) References Cited

U.S. PATENT DOCUMENTS

| | | | |
|---|---|---|---|
| 6,678,330 B1 | 1/2004 | Kondo et al. | |
| 6,757,022 B2 * | 6/2004 | Wredenhagen et al. | 348/452 |
| 7,330,218 B2 * | 2/2008 | Lin et al. | 348/619 |

(Continued)

FOREIGN PATENT DOCUMENTS

| | | |
|---|---|---|
| JP | 2000-348018 | 12/2000 |
| JP | 2001-126061 | 5/2001 |
| JP | 2005-160071 | 6/2005 |

OTHER PUBLICATIONS

Hisamitsu H. et al., Time and Spatial "epsilon"—Filter for Improving Image Quality of Compressed Video, Jul. 2004, The 2004 47th Midwest Symposium on Circuits and Systems, MWSCAS '04, vol. 1, pp. I-289-I-292.*

(Continued)

*Primary Examiner* — Vu Le
*Assistant Examiner* — Guillermo Rivera-Martinez
(74) *Attorney, Agent, or Firm* — Finnegan, Henderson, Farabow, Garrett & Dunner, L.L.P.

(57) ABSTRACT

An image processing device includes an estimator, a first calculator, a selector, a determination module, and a third calculator. The estimator estimates a motion vector to reference images of an input video from a target pixel of a process target image. The first calculator calculates candidate pixel values corresponding to positions in the reference images. The selector selects a motion vector for which the error is small as many as the number smaller than the number of motion vectors acquired for the target pixel. The determination module determines the candidate pixel values corresponding to the selected motion vectors. The third calculator calculates a pixel value after correction of the target pixel from an arithmetic average or a weighted sum of the candidate pixel value determined equal to or less than the reference and the pixel value of the target pixel.

16 Claims, 8 Drawing Sheets

(56) References Cited

U.S. PATENT DOCUMENTS

| | | | |
|---|---|---|---|
| 2002/0171759 A1* | 11/2002 | Handjojo et al. | 348/452 |
| 2005/0110902 A1* | 5/2005 | Yang | 348/452 |
| 2008/0235310 A1* | 9/2008 | Hamada | 708/201 |
| 2009/0129704 A1* | 5/2009 | Toda | 382/299 |
| 2009/0263033 A1* | 10/2009 | Weston | 382/236 |
| 2010/0020244 A1* | 1/2010 | Mitsuya et al. | 348/699 |
| 2010/0060798 A1* | 3/2010 | Sato et al. | 348/699 |
| 2010/0080296 A1* | 4/2010 | Lee et al. | 375/240.16 |
| 2011/0274175 A1* | 11/2011 | Sumitomo | 375/240.16 |

OTHER PUBLICATIONS

Takeshima H. et al., Image Registration Using Subpixel-Shifted Images for Super-Resolution, Oct. 2008, 15th IEEE International Conference on Image Processing, ICIP 2008, pp. 2404-2407.*

International Search Report from Japanese Patent Office for International Application No. PCT/JP2009/003145, Mailed Dec. 22, 2009.

Hisamitsu, H. et al., "Improvement of Image Quality for Compressed Video by Time and Spatial $\epsilon$-Filter Considering Local Characteristics of Image," Technical Report of IEICE, SIS2004-15, pp. 87-93, (2004).

* cited by examiner

IMAGE PROCESSING DEVICE FOR VIDEO NOISE REDUCTION

CROSS REFERENCE TO RELATED APPLICATION(S)

This is a Continuation Application of PCT Application No. PCT/JP2009/003145, filed on Jul. 7, 2009, which was published under PCT Article 21(2) in Japanese, the entire contents of which are incorporated herein by reference.

FIELD

One or more embodiments of the present invention relate to an image processing device configured to remove noise in a video.

BACKGROUND

Flickering in a time direction of random noise present in a video, mosquito noise shown in compressed moving images or the like causes deterioration of image quality. For this reason, a method of removing such noise has been developed. An $\epsilon$ filter is a filter for determining a difference of a pixel value between a process target pixel and a reference pixel used in averaging by a threshold value ($\epsilon$) to acquire an average of the reference pixel whose pixel value difference is equal to or less than the threshold value and the target pixel. The $\epsilon$ filter can prevent the image quality from deteriorating when impulse noise is present or when an object of an image in which the process target pixel and the reference pixel are different is represented when there is a change of the pixel value exceeding the threshold value.

In the compressed moving images, a method of applying the $\epsilon$ filter in the time direction in order to suppress the flickering and to generate a smooth image has been proposed.

In the related art, it may be difficult to solve the flickering in the time direction in the area with motion in the video.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Figure 1:
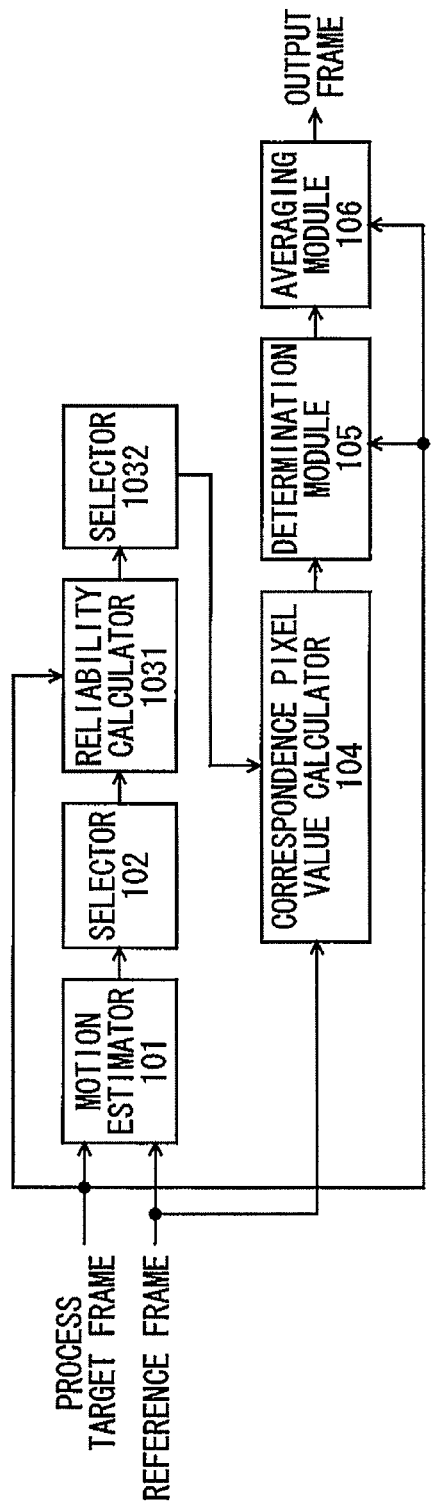
FIG. 1 is a diagram illustrating a configuration of an image processing device of a first embodiment.

According to one embodiment, there is provided an image processing device including an estimator, a first calculator, a second calculator, a first selector, a determination module, and a third calculator. The estimator is configured to estimate a motion vector to one or more reference images of an input video from a target pixel of a process target image of the input video. The first calculator is configured to calculate candidate pixel values corresponding to positions in the reference images represented by the motion vector. The second calculator is configured to calculate an error between a change pattern of pixel values in a peripheral area of the target pixel and a change pattern of pixel values in a peripheral area at a position in the reference image represented by the motion vector, for each motion vector. The first selector is configured to select among the motion vectors a motion vector for which the error is small as many as the number smaller than the number of motion vectors acquired for the target pixel. The determination module is configured to determine the candidate pixel values in which differences from the pixel value of the target pixel are equal to or less than a predetermined reference, among the candidate pixel values corresponding to the motion vectors selected by the first selector. The third calculator is configured to calculate a pixel value after correction of the target pixel from an arithmetic average or a weighted sum of the candidate pixel value determined equal to or less than the reference and the pixel value of the target pixel.

Hereinafter, embodiments of the invention will be described. In addition, the common reference numerals and signs are given to configurations and processes for performing the same operations, and the description is not repeated.

First Embodiment

An image processing device according to the embodiment performs noise removal from moving images. For example, in a television, it is possible to display a received video or a video input from the outside with high image quality. In addition, in the following embodiment, an image is referred to as a frame, but the embodiment can be also applied to an interlaced image.

FIG. 1 is a diagram illustrating the image processing device of the embodiment.

The image processing device of the embodiment includes a motion estimator 101 that calculates motion vectors to a plurality of reference frames from a target pixel of a process target frame, a selector 102 that selects a half number of motion vectors with a small matching error from the vector calculated for the target pixel, a reliability calculator 1301 that calculates the reliability of each of the selected motion vectors, a selector 1032 that selects a motion vector with high reliability, a correspondence pixel value calculator 104 that calculates a correspondence pixel value at a position corresponding to a motion vector from the reference frame, a determination module 105 that determines a correspondence pixel value, in which a difference from the pixel value of the target pixel is equal to or less then a threshold value, among the correspondence pixel values, as the reference value, and an averaging module 106 that calculates an average between the pixel value of the target pixel and the reference pixel value.

Figure 2:
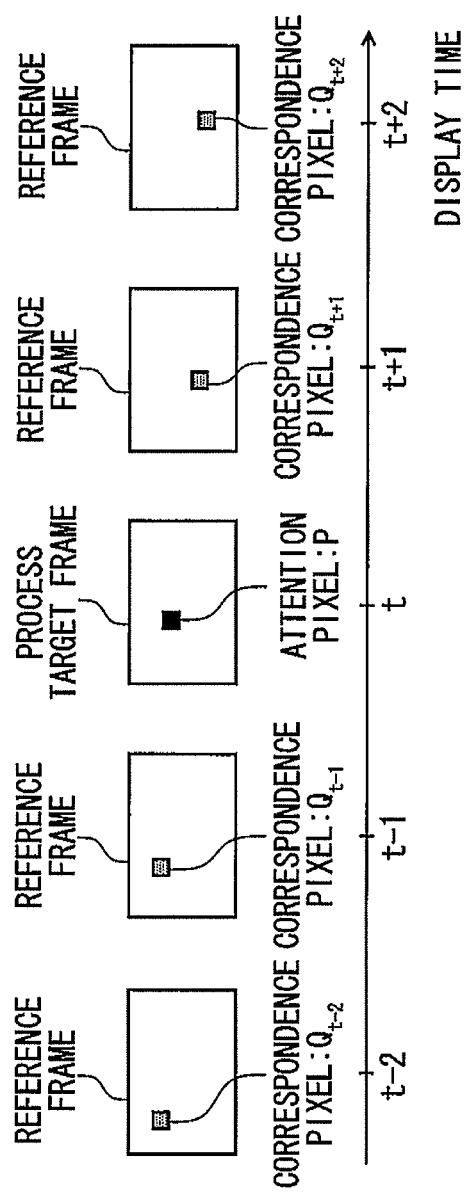
FIG. 2 is a schematic diagram illustrating an operation of the image processing device of the first embodiment.

FIG. 2 is a schematic diagram illustrating a relationship of the process target frame, the reference frame, the correspondence pixel $Q_j$, and the target pixel P. The horizontal axis indicates time. The correspondence pixel $Q_j$ indicates a pixel at a position corresponding to the motion vector acquired by the motion estimator 101 for each reference frame. It is preferable that the plurality of reference frames is set to a frame displayed at a time close to a time t of the process target frame.

In the embodiment, a case where N frames displayed before an immediately previous time (t−1) of the process target frame and N frames displayed after an immediately later time (t+1) of the process target frame are selected as the reference frames will be exemplified. FIG. 2 shows an example where N is 2. A suffix j indicates a time when the frame of each correspondence pixel is displayed.

Figure 3:
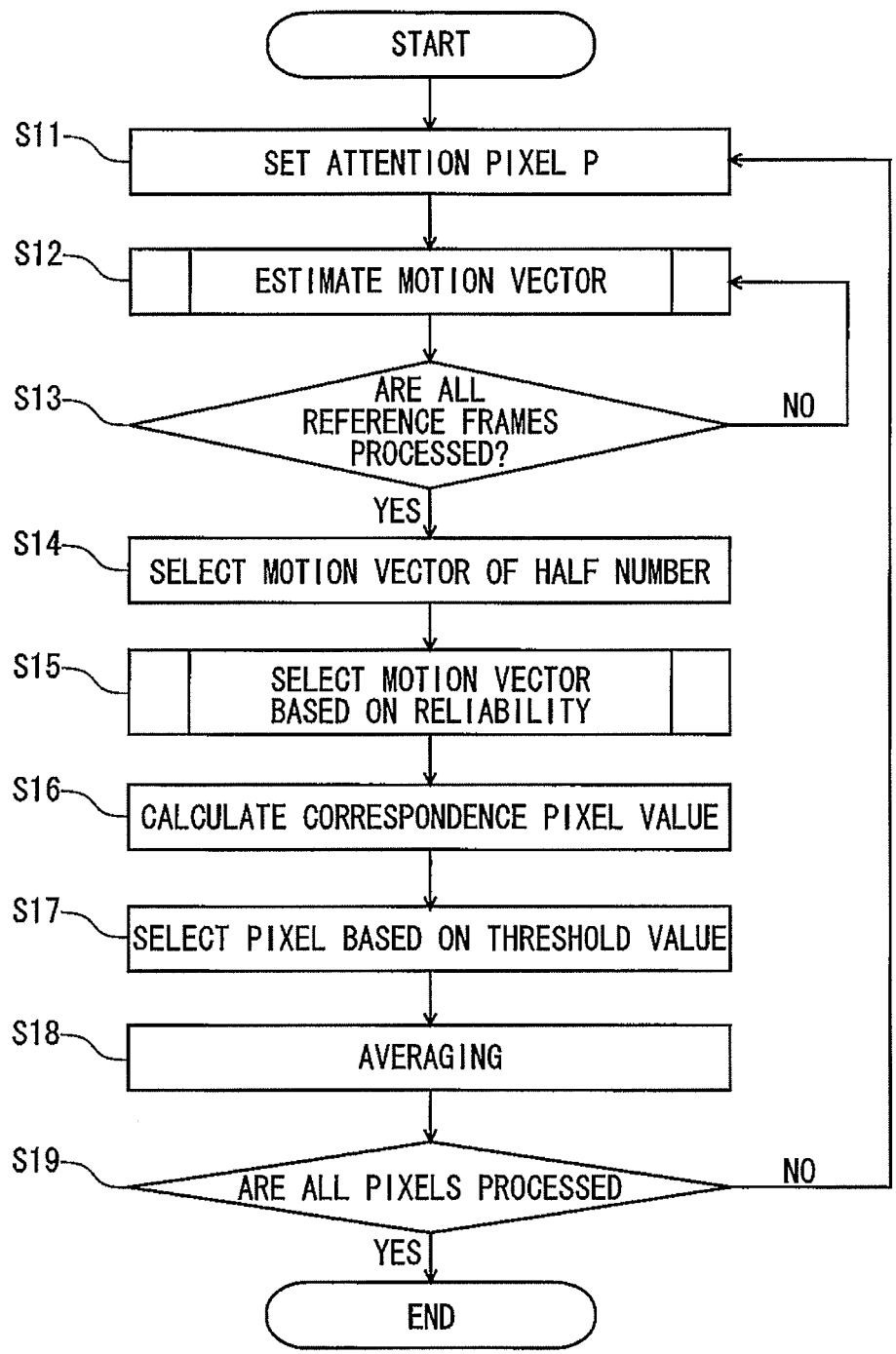
FIG. 3 is a flowchart illustrating an operation of the image processing device of the first embodiment.

Next, an operation of the image processing device of the embodiment will be described. FIG. 3 is a flowchart illustrating an operation of the image processing device of the embodiment.

First, the motion estimator 101 sets one pixel of the process target frame to the target pixel P (S11).

Figure 4:
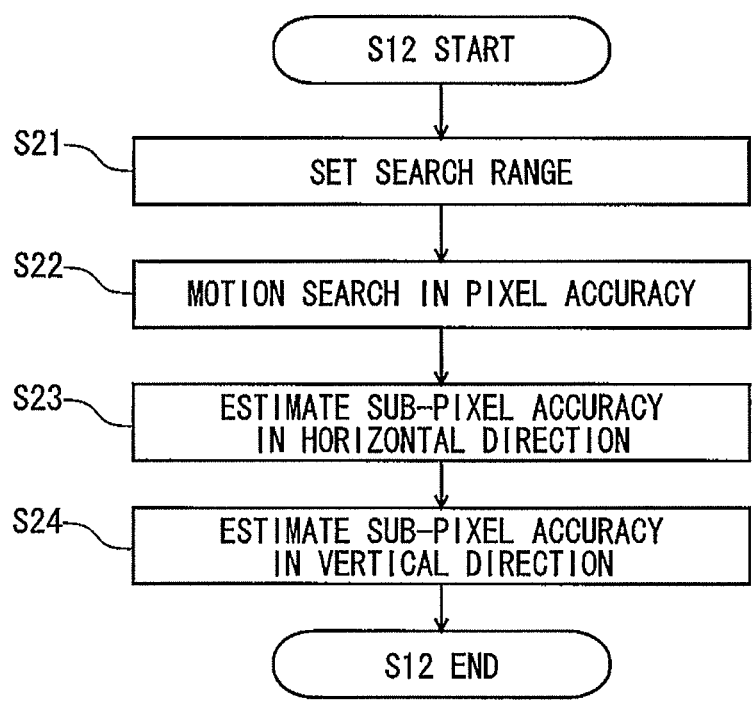
FIG. 4 is a flowchart illustrating an operation of a motion estimator.

Then, the motion estimator 101 calculates a motion vector from the target pixel P to the reference frame (S12). The motion vector may be calculated by a pixel accuracy, and may be calculated by an accuracy (sub-pixel accuracy) in more detail than one pixel. A method of calculating the motion vector by the sub-pixel accuracy will be described with reference to a flowchart shown in FIG. 4.

First, the motion vector in the pixel accuracy is calculated in the following procedure. In the reference frame, a motion search range is set around the same position as a spatial position in the target frame of the target pixel (S21). The motion search range is, for example, a rectangular block.

Then, a difference degree of change patterns of pixel values between the block centered on the respective pixels in the search range and the block centered on the target pixel is calculated. Hereinafter, the difference degree of the pixel value pattern is referred to as a matching error between center pixels of the blocks. In the embodiment, an SAD value (Sum of Absolute Differences) is used as the matching error, but the SSD value (Sum of Squared Differences) may otherwise also be used. As the matching error of the block gets larger, the difference degree from the pixel value pattern of the block centered on the target pixel gets larger. The matching error is calculated for the pixel in the search range, and a pixel position in the search range with the smallest matching error is a pixel represented by the motion vector in the pixel accuracy (S22). In this case, a high speed may be achieved using a diamond search, in addition to the searching for whole pixels in the search range.

Then, the position of the motion vector in the sub-pixel accuracy is calculated by the following method, centered on the motion vector in the pixel accuracy. First, motion in a horizontal direction is calculated (S23). It is assumed that coordinates of the pixel represented by the motion vector in the pixel accuracy are (x, y). Then, the motion amount $x_{sub}$ of the sub-pixel accuracy in the horizontal direction of the image can be acquired in the following formula by a method called equiangular line fitting, in which the SAD value in the coordinates (i, j) is SAD (i, j).

$$x_{sub} = \begin{cases} \dfrac{SAD(x+1, y) - SAD(x-1, y)}{2\left(\dfrac{SAD(x, y) - }{SAD(x-1, y)}\right)} & \text{if } SAD(x+1, y) < SAD(x-1, y) \\ \dfrac{SAD(x+1, y) - SAD(x-1, y)}{2\left(\dfrac{SAD(x, y) - }{SAD(x+1, y)}\right)} & \text{otherwise} \end{cases} \quad \text{[Formula 1]}$$

Figure 5:
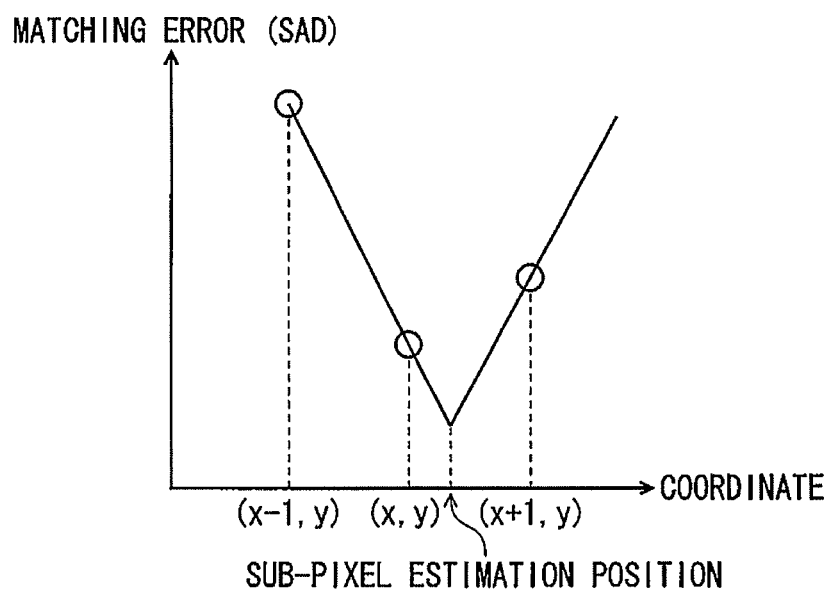
FIG. 5 is a schematic diagram illustrating equiangular line fitting.

FIG. 5 is a schematic diagram illustrating that the sub-pixel estimation is performed by the equiangular line fitting. The horizontal axis of FIG. 5 indicates coordinates in the image, and the vertical axis indicates the SAD value in the coordinates. In Formula (I), as shown in FIG. 5, a position at which lines are intersected, when the SAD values in three points of (x−1, y), (x, y), (x+1, y) with the lines of the same slope are connected, is acquired. In addition, when the SSD value is used as the difference degree of the pixel value pattern, it is preferable to calculate the motion amount using the following formula by a method called parabola fitting.

$$x_{sub} = \frac{SAD(x-1, y) - SAD(x+1, y)}{2SAD(x-1, y) - 4SAD(x, y) + 2SAD(x+1, y)} \quad \text{[Formula 2]}$$

Figure 6:
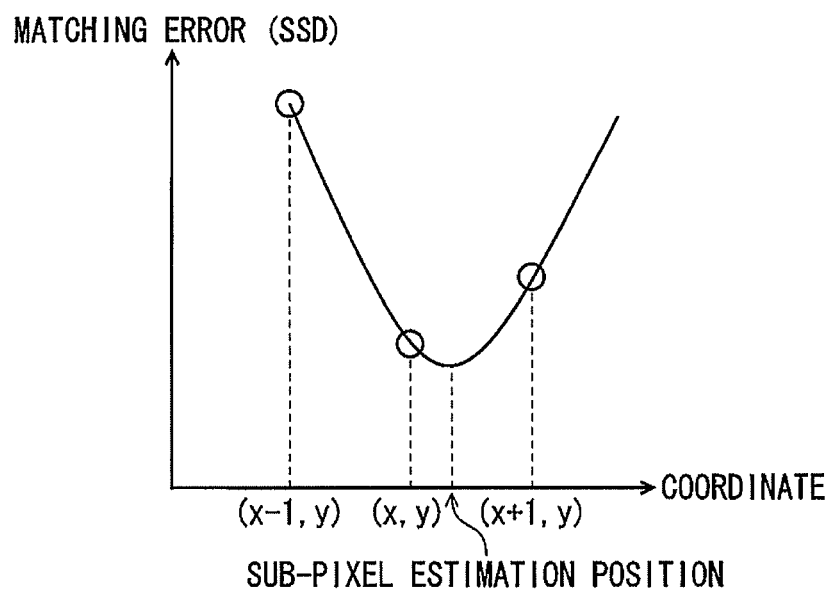
FIG. 6 is a schematic diagram illustrating parabola fitting.

FIG. 6 is a schematic diagram illustrating that the sub-pixel estimation is performed by the parabola fitting.

Then, for the vertical direction of the image, similarly, the motion amount $y_{sub}$ of the sub-pixel accuracy is acquired (S24). By the processes described above, the motion vector in the sub-pixel accuracy from the target pixel to the reference frame is calculated by $(x+x_{sub}, y+y_{sub})$.

In addition, the motion estimation may be calculated for each small area of the process target frame, in addition to calculating the motion estimation for each target pixel. For example, the process target frame is divided into blocks, the motion estimation is performed for each block, and the motion vector of the pixel in the block is similarly performed. In this case, in the operations of the selector 102 and the reliability calculator 1031 to be described later, the process of the common selection and determination is performed for each block. The motion estimation is performed for each small area, and thus it is possible to reduce the time and the process amount necessary for the whole device.

As described above, the process of S12 in FIG. 3 is completed.

Then, it is determined whether or not the estimation of the motion vector S12 is performed on all the reference frames preset from the target pixel P (S13). When 2N motion vectors for the target pixel P are not calculated (S13: No), the process returns to S12. When 2N motion vectors for the target pixel are calculated (S13: Yes), the process proceeds to S14.

Then, the selector 102 selects a half number of the number of reference frames (2N), that is, N, in order from, for example, a small matching error, among the motion vectors calculated in the motion estimator 101 (S14). First, a matching error between the pixel (correspondence pixel $Q_j$) at the position corresponding to each motion vector and the target pixel P is calculated. The block centered on the pixel Q and the block centered on the target pixel P are used as two blocks for calculating the matching error. Currently, since the position of the pixel Q is given by the sub-pixel accuracy, the pixel Q does not become the center position by merely setting the peripheral pixels of the pixel Q of the reference frame to the blocks. Thus, the block centered on the pixel Q is generated in a manner such that the reference frame is interpolated, the pixel Q is thereby becomes the center position, and re-sampling is performed such that the sub-pixels of the coordinates are not overlapped. However, to simplify the calculation, approximation and substitution to the block centered on the pixel at the position corresponding to the motion vector in the pixel accuracy may be performed without using the re-sampling.

Then, N motion vectors are selected in order from a small matching error. By using the motion vectors with the small matching error by a half of the number of reference frames, it is possible to prevent the occlusion area caused when the object is moved between the frames or deterioration of image quality caused at the time of scene change.

Figure 7:
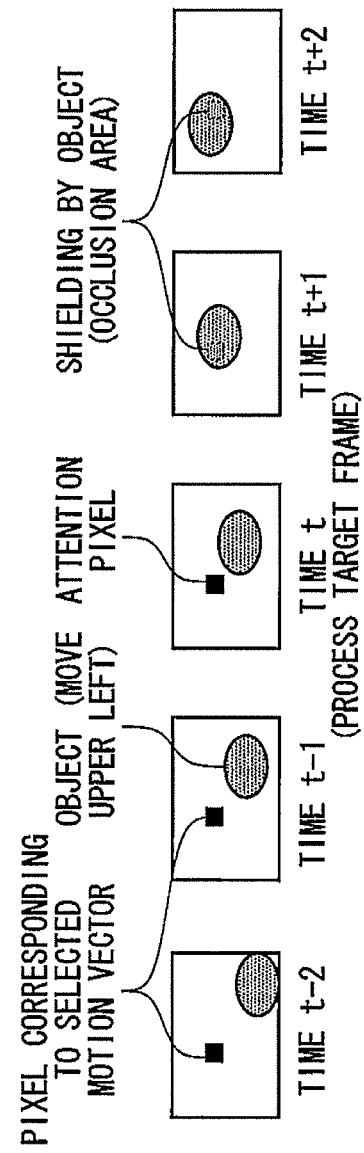
FIG. 7 is a schematic diagram illustrating occurrence of occlusion.

FIG. 7 is a schematic diagram illustrating the occlusion. FIG. 7 shows a case where one pixel of the background is the target pixel, and the object is moved on the background in an upper left direction with time. The pixel corresponding to the target pixel P appears at the time before the time t, but the pixel corresponding to the target pixel P is hidden at the time after that. As described above, when the object is moved in a regular direction, the pixel corresponding to the target pixel P is present at any of the previous time and later time of the process target frame. When a half or less of motion vectors are used, the pixel value of the occlusion area (area where the pixel corresponding to the target pixel P is covered by the object) is not referenced in the averaging module 106 to be described later, and thus it is not easy to cause the deterioration of image quality. Similarly even in the scene change, it is the same scene as the process target frame at any of the previous time or later time of the process target frame. For this reason, the pixel value is preferentially referenced from the reference frame of the same scene as the process target frame when using a half or lesser number of motion vectors. In addition, even when a different number of reference frames are set at the previous and later times of the process target frame, it is possible to obtain the same effect by selecting the motion vectors by the small number or less of the number of reference frames of the previous time and the later time. For example, when the number N of reference frames at the previous time and the later time are 2 and 4, respectively, two or less motion vectors are selected from the six motion vectors.

In addition, herein, although the motion vector is selected in which the magnitude of the matching error is the selection standard, the selection standard is not limited to the matching error. As the standard, for example, reliability calculated in the reliability calculator 1031 to be described later may be used. Moreover, a standard representing the reliability of the motion vector may be used.

Then, the reliability calculator 1031 calculates the reliability of each motion vector, and the selector 1032 selects the motion vector with high reliability therefrom (S15). The operation of S15 of the reliability calculator 1031 and the selector 1032 will be described in detail with reference to FIG. 8.

Figure 8:
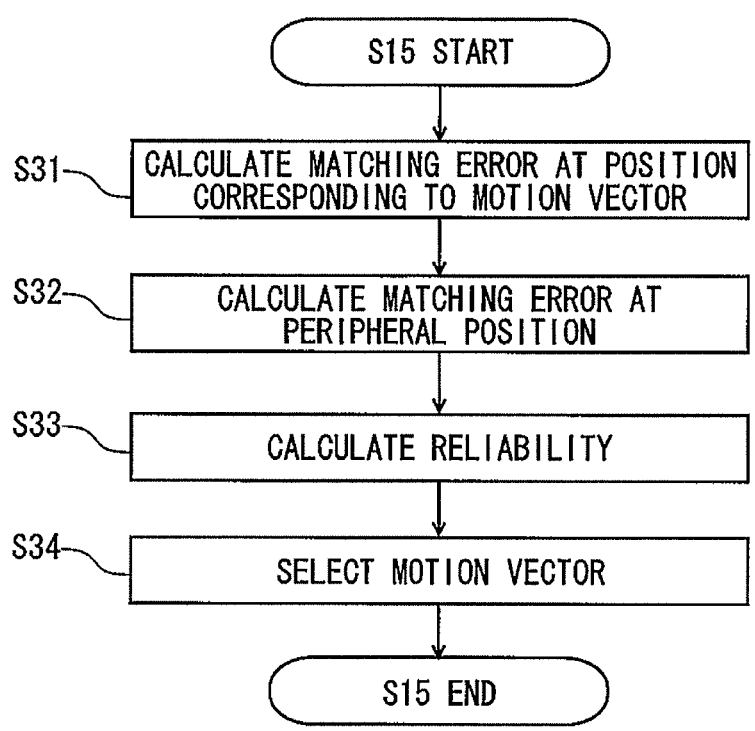
FIG. 8 is a flowchart illustrating an operation of a reliability calculator and a selector.

FIG. 8 is a diagram illustrating the operation of S15 of the reliability calculator 1031 and the selector 1032 in detail. In addition, in the reference frames, coordinates of a position corresponding to a pixel accuracy for the motion vector is (x, y). First, the reliability calculator 1031 acquires the matching error SAD (x, y) between the target pixel P and the pixel of the coordinates (x, y) of the reference frame (S31). In S31, the matching error calculated in S14 may be used. Then, the reliability calculator 1031 calculates the matching error at the positions (x−1, y), (x+1, y), (x, y−1), and (x, y+1) adjacent up, down, left, and right to (x, y) (S32). In addition, since the matching error of the (x, y) and the adjacent positions thereof has already been calculated by the process of the motion estimator 101, the process result may be used. Then, the reliability calculator 1031 calculates reliability Conf of the motion vector (S33). In the calculation of the reliability, first, the maximum value of four matching errors at the adjacent positions is acquired. That is SAD (x, y)_max. Then, the reliability Conf of the motion vector is calculated by the following formula.

$$Conf = f_1(SAD(x, y)) + f_2\left(\frac{SAD(x, y)}{SAD(x, y)\_max}\right) \quad \text{[Formula 3]}$$

Functions $f_1$ and $f_2$ are functions of returning a larger value as factors get small. For example, for the value of z, a monotone decreasing function $f_k(z)$ may be used.

$$f_k(z) = c_k - a_k z \quad \text{[Formula 4]}$$

In addition, the lower limit of decrease of reliability may be provided, and the following formula may be used.

$$f_k(z) = \begin{cases} c_k - a_k z & \text{if } z < z_{th,k} \\ c_k - a_k z_{th,k} & \text{otherwise} \end{cases} \quad \text{[Formula 5]}$$

In the formula, $a_k \geq 0$, $c_k$, $z_{th,k}$ are constant numbers. The first term of Conf indicates absolute reliability of motion. As the value of SAD (x, y) gets smaller, the reliability gets higher. The second term indicates relative reliability from the peripheral position of motion, and is calculated on the basis of a ratio of SAD (x, y)_max and SAD (x, y)_. As the ratio gets lower, the reliability gets higher. That is, the increase of the second term corresponds to the decrease of the angle of two lines in the equiangular line fitting, and it is possible to assess the reliability of motion estimation as being high. In addition, as the relative reliability, a difference between SAD (x, y) and SAD (x, y)_max may be used. In this case, the reliability Conf is acquired by the following Formula (6).

$$Conf = f_1(SAD(x,y)) + f_2(SAD(x,y) - SAD(x,y)\_max) \quad \text{[Formula 6]}$$

In addition, when the SSD value is used as the matching error, it is preferable to set the relative reliability on the basis of the following formula.

$$\max\{SAD(x-1,y) - 2SAD(x,y) + SAD(x+1,y), SAD(x,y+1) - 2SAD(x,y) + SAD(x,y+1)\} \quad \text{[Formula 7]}$$

The increase of the value of Formula (7) means that the curve connecting the SSD values become precipitous in the parabola fitting. That is, it corresponds to the increase of the reliability of the motion vector. Finally, the selector 1032 selects the motion vector in which Conf is larger than a threshold value (S34).

In the above description, the method of calculating the Conf using the matching errors between the correspondence position (x, y) in the pixel accuracy of the motion vector and four positions of up, down, left, and right, but the positions for calculating the matching errors are not limited thereto. For example, the matching errors at the correspondence position $(x+x_{sub}, y+y_{sub})$ and the peripheral positions thereof may be calculated, and the Conf may be calculated from the relative largeness and smallness relationship. In addition, the Conf may be defined only by a term of relative reliability. As described above, the process of S15 is completed.

Then, the correspondence pixel value calculator 104 calculates the pixel value of the position corresponding to the motion vector selected by the selector 1032, from the reference frames (S16). This is called a correspondence pixel value. If the motion vector is in the pixel accuracy, the pixel value of the corresponding position on the reference frame may be read. When the motion vector is in the sub-pixel accuracy, the pixel value is calculated by interpolation from the peripheral pixels of the position corresponding to the motion vector. Simply, it is calculated using four peripheral pixels by bilinear interpolation.

Then, in the determination module 105, the correspondence pixel value, a difference of which from the pixel value of the target pixel P is smaller than a predetermined threshold value, is selected from the correspondence pixels (S17). This is called a reference pixel value. Herein, a case where the number of correspondence pixels is n will be described. The threshold value may be fixed, and may be variable, for example, is determined according to a noise level estimated from the image.

Then, in the averaging module 106, an arithmetic average of the pixel value of the target pixel P and n reference pixel values are acquired, which is a pixel value of the process result of the target pixel P (S18). In addition, averaging means may be used in weighting in addition to the arithmetic average. As a weight applied at the time of weighting, for example, a larger weight may be applied as the reliability calculated in the reliability calculator 1031 gets higher.

As described above, the processes of S11 to S18 are performed on all the pixels of the process target frame, and the noise removing process of the image processing device of the embodiment is completed (S19).

As described above, according to the image processing device, the motion vector with the high reliability is selected and used to acquire the correspondence pixel value, the correspondence pixel value close in the pixel value to the target pixel value is referenced by the averaging, and thus it is possible to generate a high-quality noise-removed with image little deterioration of image quality such as blurring and artifacts even in an area with motion.

The invention is not limited to the usage of noise removal in a single body of the device, and may be used as a pre-process or a post-process of various image processing devices. For example, when combining with a device for enlarging an image, there is an effect of suppressing noise present in an input video which is easily recognized by the image enlarging process. In addition, when combining with a device for making an image sharp and the invention is used in a pre-process, it is possible to perform a process of making an original image component such as edge and texture sharp while suppressing amplification of the noise.

In addition, the invention is not limited to the embodiment as it is, and may be embodied by modifying the constituent elements within the scope which does not deviate from the concept thereof in the embodying step. In addition, various inventions may be formed by appropriate composition of the plurality of constituent elements disclosed in the embodiment. For example, several constituent elements may be removed from all the constituent elements described in the embodiment. In addition, the constituent elements in different embodiments may be appropriately combined.

What is claimed is:

1. An image processing device, comprising:
   an estimator configured to estimate a motion vector to a plurality of reference images of an input video from a target pixel of a process target image of the input video, for each reference image,
      wherein the plurality of reference images include pre-display reference images to be displayed before the process target image and post-display reference images to be displayed after the process target image;
   a first calculator configured to calculate an error between a change pattern of pixel values in a peripheral area of the target pixel and a change pattern of pixel values in a peripheral area at a position in the reference image represented by the motion vector, for each motion vector;
   a selector configured to select a motion vector based on the calculated error among the motion vectors acquired for the target pixel, a number of the selected motion vectors being equal to or less than a predetermined number; and
   a second calculator configured to calculate a corrected pixel value of the target pixel by using all or a part of candidate pixels having positions corresponding to a position in the reference image represented by the selected motion vector,
      wherein the number of selected motion vectors is equal to or less than a smaller number between a number of the pre-display reference images and a number of the post-display reference images.

2. The image processing device according to of claim 1, wherein the number of selected motion vectors is equal to the smaller number between the number of pre-display reference images and the number of post-display reference images.

3. The image processing device of claim 1, wherein the number of pre-display reference images is the same as the number of post-display reference images, and the number of selected motion vectors is equal to or less than one-half a number of the motion vectors acquired for the target pixel.

4. The image processing device of claim 1, wherein the number of pre-display reference images is the same as the number of post-display reference images, and the number of selected motion vectors is equal to one-half a number of the motion vectors acquired for the target pixel.

5. The image processing device of claim 1, further comprising:
   a determination module configured to determine a candidate pixel value which differs from the pixel value of the target pixel by an amount equal to or less than a predetermined reference, among the candidate pixels having positions corresponding to a position in the reference image represented by the selected motion vector selected by the selector,
   wherein the second calculator calculates the corrected pixel value of the target pixel based on an arithmetic average or a weighted sum of the candidate pixel value determined equal to or less than the predetermined reference and the pixel value of the target pixel.

6. An image processing device, comprising:
   an estimator configured to estimate a motion vector to a plurality of reference images of an input video from a target pixel of a process target image of the input video, for each reference image,
   wherein the plurality of reference images include pre-display reference images to be displayed before the process target image and post-display reference images to be displayed after the process target image;
   a first calculator configured to calculate a reliability for each motion vector;
   a selector configured to select a motion vector based on the calculated reliability among motion vectors acquired for the target pixel, a number of the selected motion vectors being equal to or less than a predetermined number; and
   a second calculator configured to calculate a corrected pixel value of the target pixel by using all or a part of candidate pixels having positions corresponding to a position in the reference image represented by the selected motion vector,
      wherein the number of selected motion vectors is equal to or less than a smaller number between a number of the pre-display reference images and a number of the post-display reference images.

7. The image processing device of claim 6, wherein the first calculator calculates higher reliability as a first error becomes smaller than a second error, the first error being between a change pattern of pixel values in a peripheral area of the target pixel and a change pattern of pixel values in a peripheral area at a position in the reference image represented by the motion vector, the second error being between the change pattern of the pixel values in the peripheral area of the target pixel and a change pattern of pixel values in an area around a plurality of peripheral positions in the reference images represented by the motion vectors.

8. The image processing device of claim 6, wherein the number of selected motion vectors is equal to a smaller number between the number of pre-display reference images and the number of post-display reference images.

9. The image processing device of claim 6, wherein the number of pre-display reference images is the same as the number of post-display reference images, and the number of selected motion vectors is equal to or less than a half number of motion vectors acquired for the target pixel.

10. The image processing device of claim 6, wherein the number of pre-display reference images is the same as the number of post-display reference images, and the number of selected motion vectors is equal to one-half of a number of motion vectors acquired for the target pixel.

11. The image processing device of claim 6, further comprising:
a determination module configured to determine a candidate pixel value which differs from the pixel value of the target pixel by an amount equal to or less than a predetermined reference, among the candidate pixels having positions corresponding to a position in the reference image represented by the selected motion vector selected by the selector,
wherein the second calculator calculates the corrected pixel value of the target pixel based on an arithmetic average or a weighted sum of the candidate pixel value determined equal to or less than the predetermined reference and the pixel value of the target pixel.

12. An image processing device, comprising:
an estimator configured to estimate a motion vector to a plurality of reference images of an input video from a target pixel of a process target image of the input video, for each reference image,
wherein the plurality of reference images include pre-display reference images to be displayed before the process target image and post-display reference images to be displayed after the process target image;
a first calculator configured to calculate a first error between a change pattern of pixel values in a peripheral area of the target pixel and a change pattern of pixel values in a peripheral area at a position in the reference image represented by the motion vector, for each motion vector;
a first selector configured to select a motion vector based on the calculated first error among motion vectors acquired for the target pixel, a number of the selected motion vectors being equal to or less than a predetermined number;
a second calculator configured to calculate a plurality of second errors between the change pattern of the pixel values in the peripheral area of the target pixel and a change pattern of pixel values in an area around a plurality of peripheral positions in the reference images represented by the motion vectors;
a reliability calculator configured to calculate higher reliability as the first error becomes smaller than the second errors;
a second selector configured to select a motion vector having a reliability equal to or more than a predetermined reference, among the selected motion vectors selected by the first selector, and
a third calculator configured to calculate a corrected pixel value of the target pixel by using all or a part of candidate pixels having positions corresponding to a position in the reference image represented by the selected motion vector selected by the second selector,
wherein the number of selected motion vectors is equal to or less than a smaller number between a number of the pre-display reference images and a number of the post-display reference images.

13. The image processing device of claim 12, wherein the reliability calculator calculates the higher reliability as a ratio of the first error to a maximum value of the second errors becomes smaller.

14. The image processing device of claim 12, wherein the reliability calculator calculates the higher reliability as the first error gets smaller.

15. The image processing device of claim 12, further comprising:
a determination module configured to determine a candidate pixel value which differs from the pixel value of the target pixel by an amount equal to or less than a predetermined threshold value, among the candidate pixels which positions correspond to a position in the reference image represented by the selected motion vector selected by the second selector,
wherein the third calculator calculates the corrected pixel value of the target pixel based on an arithmetic average or a weighted sum of the candidate pixel value determined equal to or less than the predetermined threshold value and the pixel value of the target pixel.

16. The image processing device of claim 12,
wherein the first selector selects a plurality of motion vectors among the motion vectors acquired for the target pixel, the number of selected motion vectors being equal to or less than a predetermined number.

* * * * *